Nov. 5, 1940.  H. A. WARDY  2,220,562
FILING DEVICE
Original Filed June 7, 1937  4 Sheets—Sheet 1

Inventor
HARRY A. WARDY
By
His Attorney

Nov. 5, 1940.   H. A. WARDY   2,220,562
FILING DEVICE
Original Filed June 7, 1937   4 Sheets-Sheet 2

Inventor
Harry A. Wardy
By
His Attorney

Nov. 5, 1940.    H. A. WARDY    2,220,562
FILING DEVICE
Original Filed June 7, 1937    4 Sheets-Sheet 3

Inventor
Harry A. Wardy
By
His Attorney

Patented Nov. 5, 1940

2,220,562

UNITED STATES PATENT OFFICE 2,220,562

FILING DEVICE

Harry A. Wardy, Los Angeles, Calif., assignor to Add-A-Guide, Incorporated, Los Angeles, Calif., a corporation of California Application June 7, 1937, Serial No. 146,885
Renewed March 27, 1940

19 Claims. (Cl. 129—16.1)

This invention relates to a device for handling or containing papers, ledger sheets, cards, etc., and relates more particularly to an improved filing device. A general object of this invention is to provide a practical, effective, device for filing papers, ledger sheets, etc. that may be easily and quickly enlarged or reduced in capacity.

Another object of this invention is to provide a filing device in which the cards, papers, or sheets are contained in a systematic manner in holders that normally hold the papers in compact packs and that are operable to raise the papers to positions where their identifying means are all plainly visible and the papers are easily removable.

Another object of this invention is to provide a filing device of the character mentioned embodying a sectional container or box in which the box sections may be added or removed at will to increase or decrease the capacity of the device.

Another object of this invention is to provide a filing device of the character mentioned in which each insertable and removable section of the container or box embodies a holder of the character referred to above whereby the addition of a section to the box provides the device with an additional card or paper holder for carrying an additional group or pack of cards or papers.

Another object of this invention is to provide a filing device of the character mentioned embodying novel and particularly effective means for connecting the sections of the container or box to form a dependable, rigid and symmetrical assembly or box structure.

Another object of this invention is to provide a filing device of the character mentioned in which the cards, folders, or papers may be individually or collectively removed from the holders and restored to their properly centered and located positions in the holders at any time, without the manipulation of mechanical parts, or the like.

Another object of this invention is to provide a filing device of the character mentioned in which the holders embody lifting elements for raising the cards or papers to positions where they are in stepped relation with their upper portions readily visible and accessible, which lifting elements retain the papers in this stepped relation until they are deliberately restored to their compact, normal relation.

Another object of this invention is to provide a filing device of the character mentioned in which the cards, folders or papers are guided and supported in the holders in such a manner that they automatically assume positions to be raised by the lifting elements when the holders are swung back and the lifting elements are raised.

A further object of this invention is to provide a filing device of the character mentioned embodying novel means for automatically latching the lifting elements in their raised positions where the upper portions of the identifying means of the cards, papers, or folders are all plainly visible and freely accessible.

The various objects and features of my invention will be fully understood from the following detailed description of a typical, preferred form and application of the invention, throughout which description reference is made to the accompanying drawings, in which:

The present invention may be embodied in forms for handling papers, cards, folders, etc., of various sizes and kinds and in forms for use in cabinets and filing systems of various natures. In the following detailed description I will describe typical embodiments of the invention, it being understood that the invention is not to be construed as limited or restricted to the specific forms or applications about to be described, but that it is to be taken as including any features or modifications that may fall within the scope of the claims.

The device of the present invention illustrated in Figs. 1 to 17 inclusive includes, generally two end sections 10, a plurality of intermediate sections 11, means 12 for releasably connecting the sections 10 and 11 to constitute a box structure, packs P of papers, cards, or folders 13, and holders 14 on the intermediate box sections 11 having means 15 for raising the papers or folders 13 to positions where they are in visible and accessible stepped relation.

The end sections 10 constitute the ends of the container, box or drawer for carrying the sheets or papers. The end sections 10 are formed of sheet metal or the like and may be identical with the exception of certain parts of the connecting means 12 which are incorporated in them. Each end section 10 includes sides 16, an outer end 17 and a bottom 18. The sides 16 and the ends 17 are substantially vertical and the bottoms 18 are substantially horizontal. In practice the sides 16, the ends 17 and the bottoms 18 of the sections 10 may be formed of single integral sheets of metal. The end sections 10 further include inner walls 19 which slope or incline upwardly and outwardly from the inner edges of the bottoms 18 to the upper edges of the ends 17. The inner walls 19 have substantially vertical side parts 20 spaced inwardly from the sides 16. The walls 19 may have foot flanges 21 sweated, welded, or otherwise fixed to the upper surfaces of the bottoms 18. Inwardly and downwardly turned flanges 22 extend along the upper edges of the sides 16 and the ends 17 and complementary flanges 23 extend along the upper edges of the inner walls 19 and their side parts 20. The flanges 22 and 23 constitute lapped joints and may be sweated, welded, riveted, or otherwise secured together.

The end sections 10 are preferably provided with hand grips or similar means to facilitate the handling of the device. In the preferred arrangement illustrated openings 24 are provided in the ends 17 of the sections 10 and are adapted to receive the user's hands when he lifts the device. Upwardly and inwardly curved lips 25 are provided along the upper walls of the openings 24 to be engaged by the user's hands inserted in the openings. Horizontal drawer guides 26 may be provided on the outer surfaces of the sides 16. If desired card holders 27 may be provided on one or both of the sections 10. The holders 27 may be provided on the ends 17 above the openings 24 and are adapted to receive classifying or identifying cards or the like.

The intermediate sections 11 are assembled between the end sections 10 and the sections 10 and 11 are all connected together by the means 12 to form a rigid container or box. The sections 11 carry or embody the holders 14 and in accordance with the invention the sections 11 may be added to or removed from the device to increase or reduce its capacity or size as found necessary. Accordingly, the device may embody one or more holder sections 11. In the present case it will be assumed that the device embodies a plurality of sections 11. The sections 11 are preferably identical and may be formed of sheet metal or the like.

Each section 11 includes two spaced substantially vertical sides 28 and a substantially horizontal bottom 29. The sides 28 include outer walls 30 and inner walls 31 in spaced apart relation. The bottoms 29 are preferably laminated or of two-ply construction. In the form of the invention illustrated in the drawings the outer walls 30 of the sides 28 are integral with the outer or lower members 32 of the bottoms 29 and the inner walls 31 of the sides 28 are integral with the inner members 33ª of the bottoms. The outer and inner walls 30 and 31 of the sides 28 may have suitable flush lapped joints 34 extending along their upper edges. The joints 34 preferably close the upper ends of the spaces between the walls 30 and 31 and the flanges or lapped parts of the joints may be welded together. In accordance with the invention the inner walls 31 of the sides 28 have downwardly and inwardly inclined lower portions 31ª to locate or center the cards, papers, or folders 13, as will be hereinafter described.

The sides 28 of the sections 11 preferably have internal reinforcing members. These reinforcing members each have upper and lower portions 35 and 36, respectively, lying against the inner surface of the outer wall 30 and an intermediate portion 37 lying against the inner surface of the inner wall 31. The lower portions 36 of the reinforcing members have in-turned foot flanges 38 lying against the upper surfaces of the bottom members 32. The outer layers or members 32 of the bottoms 29 have their end portions 32ª bent downwardly and then horizontally outwardly to join the walls 30. This shaping or bending of the bottom walls 32 provides substantially rectangular openings 33 defined by the portions 32ª, the lower portions of the outer walls 30 and the foot flanges 38 and materially reinforces the corner parts of the U-shaped sections 11. The reinforcing portions 35, 36 and 37 and the foot flanges 38 may be welded or otherwise fixed to the internal surfaces of the walls 30 and 31 and the members 32, respectively. The sections 11 just described constitute simple and inexpensive structures that are small and compact and that are inexpensive to manufacture.

The end sections 10 and the intermediate sections 11 are shaped and proportioned to be assembled and connected together by the means 12 to form a drawer, tray or box. The end sections 10 constructed as above described are open topped structures having open inner ends and the intermediate sections 11 are substantially U-shaped structures having their tops and both ends open. The sections 10 and 11 are adapted to be arranged or aligned with their respective sides 16 and 30 in alignment and with the open ends of the end sections 10 facing inwardly or toward one another. The sections 10 and 11 are proportioned so that their sides 16 and 30 are in substantially the same vertical planes and so that their upper edges are in a common horizontal plane when the sections are arranged or aligned as above described.

The means 12 are provided to connect the sections 10 and 11 together in the relationship just described to form a tray or box. The means 12 are such that the sections 10 and 11 may be disconnected at any time and additional intermediate sections 11 may be interposed in the assembly when necessary. The means 12 include or provide openings 40 in the sides 28 of the intermediate sections 11. The openings 40 are preferably in the upper portions of the sides 28 and are defined by the inner walls 31, the joints 34, the portions 35, and shoulders 41 at the lower ends of the portions 35. The openings 40 are open at the forward edges of the sides 28. The connecting means 12 further include parts or tongues 42 projecting from the rear edges of the section sides 28 to cooperate with the openings 40 of the adjacent sections. The tongues 42 may each include two spaced members 43 secured to the opposing walls of the openings 40 extending into the openings 40 distances less than one half the depth of the openings and projecting outwardly beyond the rear edges of the sides 28. The outer edge portions of the tongue members 43 are preferably rounded or curved inwardly toward one another so that the tongues 42 present blunt outer edges shaped to be easily inserted in the openings 40. The tongues 42 are proportioned to rather accurately fit the openings 40 and their members 43 may be flexible to some extent to frictionally bear against the walls of the openings 40. The cooperation of the tongues 42 with the openings 40 holds the sides 28 of the sections 11 in proper alignment and resist relative lateral and vertical movement between the sides 28 of the adjacent sections.

The means 12 further include tongue and socket connections between the bottoms 29 of the sections 11. Tongues 44 project rearwardly beyond the rear edge of the bottom 29 of each section 11. The tongues 44 may be formed of channel-shaped stock and have portions secured in the openings 33. The tongues 44 may be secured to the walls of the openings 33 by welding or the like. In the preferred construction the tongues 44 project into the openings 33 distances less than one half the depth of the openings. The projecting portions of the tongues 44 are adapted to be received in the openings 33 in the bottoms 29 of the adjacent sections 11. It will be apparent that when the sections 11 are arranged in edge to edge relation with their tongues 42 fitting the openings 40 of adjacent sections, the tongues 44 may fit the openings 33 in the adjacent sections. The cooperation of the tongues 44 with the openings 33 assists in preventing undesirable relative vertical and lateral movement between the lower portions of the adjacent sections 11.

The releasable connecting means 12 include tongue and socket connections between the endmost sections 11 and the end sections 10. Tongues 45 project rearwardly from the sides 16 of the front end section 10 to cooperate with the openings 40 in the foremost section 11. The tongues 45 may be similar to the above-described tongues 42 and project rearwardly from the rear edges of the walls 16. The front end section 10 is provided with tongues 46 projecting rearwardly to cooperate with the openings 33 in the foremost section 11. The tongues 46 may be similar to the above described tongues 44 and may be constructed of channel-shaped stock. The tongues 46 may be welded or otherwise secured to the bottom 18 and the adjacent parts of the wall 19 of the front end section 10. Openings 47 are provided in the forward edges of the sides 16 of the rear end section 10 to receive the tongues 42 of the rearmost section 11. The openings 47 may occur between the sides 16 and the side portions 20 of the inner wall 19. Openings 48 are provided in the forward and lower edge portion of the inner wall 19 of the rear end section 10 to receive the tongues 44 of the rearmost section 11. It will be apparent how the tongues 45 and 46 of the front end section 10 cooperating with the openings 40 and 33 of the foremost section 11 connect these sections against relative lateral and vertical displacement. In a similar manner the tongues 42 and 44 of the rear section 11 cooperating with the openings 47 and 48 of the rear end section 10 connect these sections against relative lateral and vertical displacement.

The connecting means 12 for connecting together the several sections 10 and 11 further include latches for releasably securing together the adjacent sections of the tray or box. A latch 49 is pivoted on the outer surface of each side 28 of each section 11. The latches 49 may be pivotally supported by pins 50 projecting from the sides 28. The latches 49 are adapted to be swung to positions where they project beyond the rear edges of the sides 28. The rear portions of the latches 49 are provided with downwardly facing notches 51. A headed pin 52 is provided on the outer surface of each wall 30 of each section 11. The pins 52 are located adjacent the forward edges of the walls 30. The latches 49 and the pins 52 are related so that the notches 51 receive the pins 52 when the latches are swung to their down or substantially horizontal positions. The cooperation of the pins 52 with the notches 51 effectively connects the sections 11 against relative axial or longitudinal separation.

Figures 4, 17:
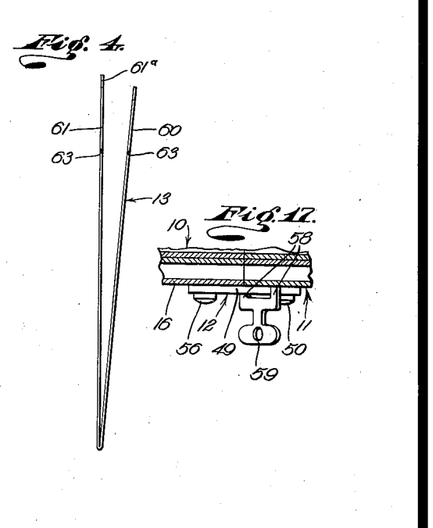
Fig. 4 is an edge or side elevation of one of the folders.
Fig. 17 is an enlarged fragmentary horizontal detailed sectional view taken as indicated by line 17—17 on Fig. 1 illustrating the manner of employing the key to turn one of the latches.
Figures 5, 6:
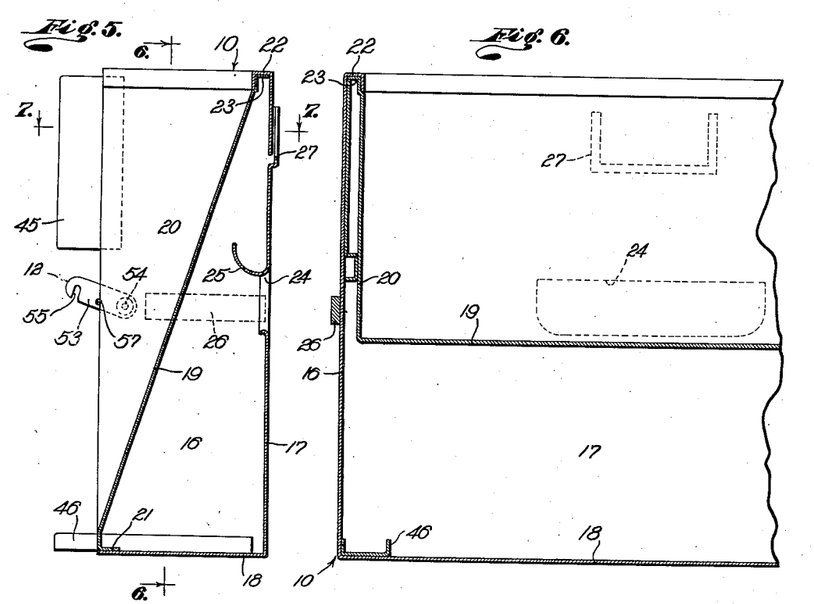
Fig. 5 is an enlarged vertical detailed sectional view of the front section of the container or box of the invention.
Fig. 6 is a fragmentary vertical detailed sectional view taken as indicated by line 6—6 on Fig. 5.
Figure 7:
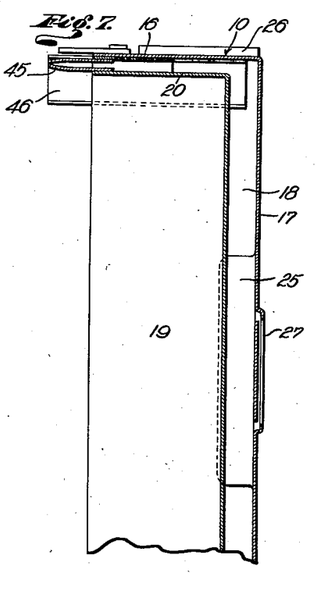
Fig. 7 is a fragmentary horizontal detailed sectional view taken as indicated by line 7—7 on Fig. 5.
Figures 8, 9:
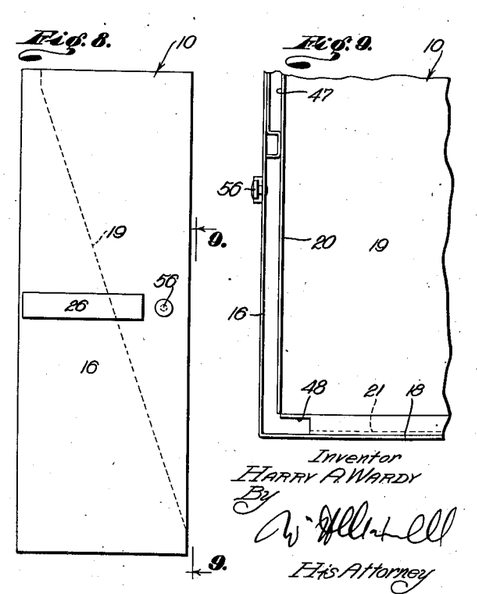
Fig. 8 is a side elevation of the rear section of the box structure.
Fig. 9 is a fragmentary elevation of the inner end of the rear section of the box structure.
Figure 10:
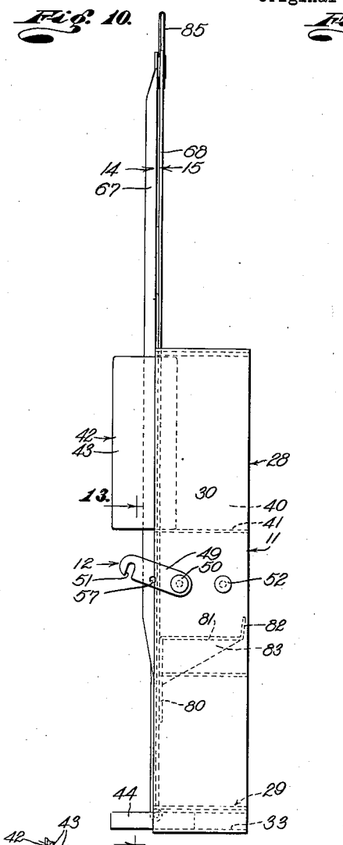
Fig. 10 is a side elevation of one of the intermediate sections showing the lifting element in its down or normal position.
Figure 11:
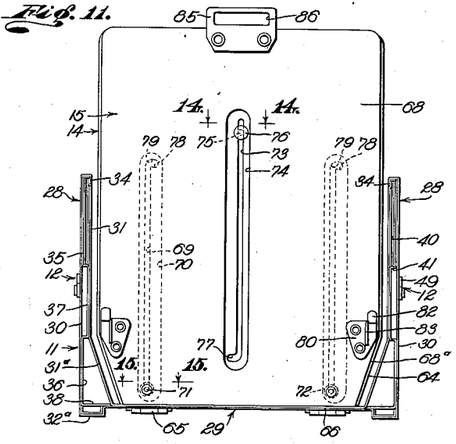
Fig. 11 is a reduced front elevation of one of the intermediate sections.
Figure 12:
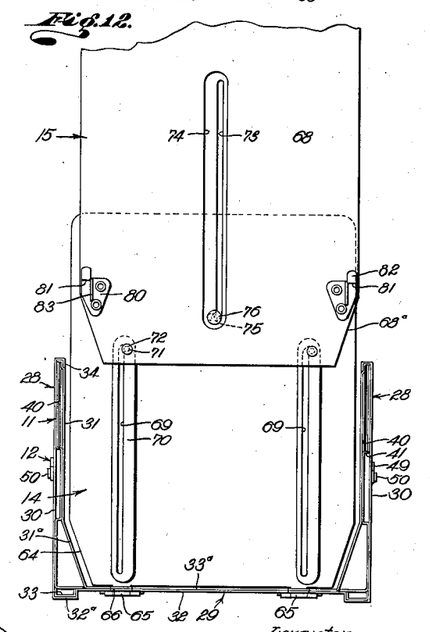
Fig. 12 is a fragmentary front elevation of one of the intermediate sections with its lifting element in the elevated position.
Figure 13:
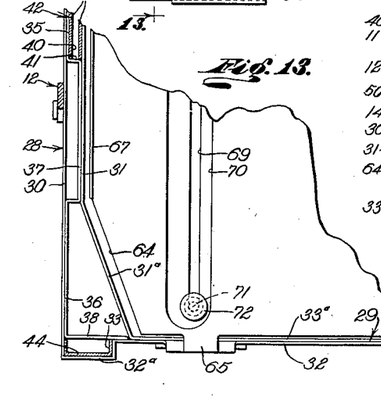
Fig. 13 is an enlarged fragmentary vertical sectional view taken as indicated by line 13—13 on Fig. 10.

Latches 53 are provided on the sides 16 of the front end section 10. The latches 53 may be pivotally supported by pins 54 projecting from the sides 16. The latches 53 are adapted to project rearwardly beyond the rear edges of the sides 16 and their rear portions have downwardly facing notches 55 for cooperating with the pins 52 on the foremost section 11. The latches 53 cooperating with the pins 52 of the foremost section 11 effectively connect the end section 10 with the foremost section 11. The rear end section 10 is releasably connected with the rearmost section 11. Pins 56 project from the sides 16 of the rear end section 10 adjacent the forward edges of the sides. The pins 56 are adapted to be received in the notches 51 of the latches 49 on the rearmost section 11. An opening 57 is provided in each latch 49 and 53. The openings 57 are adapted to receive a tine 58 of a key 59. As illustrated in Fig. 17 of the drawings the double tined key 59 is adapted to be arranged with one of its tines 58 against an edge of a latch 49 and with its other tine 58 in the opening 57 for the purpose of pivoting or swinging the latch.

It is believed that it will be understood how the several sections 10 and 11 may be assembled together with their respective tongues and openings in cooperation whereupon the latches 49 and 53 may be pivoted in the positions where their notches 51 and 55 cooperate with the pins 52 and 56 respectively, to connect the sections together to form a rigid tray or box structure. It is preferred to position the latches 49 and 53 and the pins 52 and 56 so that the latches are horizontally aligned with the guides 26 when the latches are in their down or operative positions. The guides 26 are adapted to protect the latches and the latch pins against injury in the event that the device is struck or brought into accidental engagement with a stationary object. Further the latches and latch pins positioned as just described do not interfere with movement of the device or box in the event that the device is slidably arranged in a cabinet or the like where the guides 26 operate as drawer guides.

In accordance with the broader aspects of the invention cards, papers, ledger sheets, folders, files and the like of various natures may be used or handled in the device. In the typical application of the invention illustrated in the drawings the device is disclosed handling or containing folders 13 for holding ledger sheets, bills, etc. A pack P of folders 13 may be arranged in each section 11. Each folder 13 may be constructed of a single sheet of paper, cardboard, or the like, folded transversely between its ends to have a front 60 and a back 61. The folders 13 are preferably constructed so that their backs 61 project upwardly beyond the upper edges of their fronts 60 and the upwardly projecting portions 61$^a$ of the folder backs 61 may be employed as tabs for carrying identifying or classifying data. It is to be understood that a plurality of ledger sheets or papers of other characters may be arranged in each folder 13 to project beyond the upper edge of its front 60 to have their identifying tabs, if any, visible at the upper end of the folder.

In accordance with the invention the folders 13 have laterally projecting tabs or projections 62 at their opposite sides or vertical edges. In the preferred construction both the fronts 60 and the backs 61 of the folders 13 have projections 62 and the projections 62 on the back and the front of a folder 13 are identical. The projections 62 may be integral with the folders 13 and may extend downwardly from the upper edges of the fronts 60 and the backs 61. The lower ends of the projections 62 constitute downwardly facing shoulders 63 on the folders 13 engageable by the lifting means 15 of the holders 14. The shoulders 63 of the adjacent folders 13 of each pack P are arranged in a stepped or graduated series. The shoulders 63 of the foremost folder 13 of a pack P are spaced above the shoulders 63 of the second to the foremost folder 13 and the shoulders 63 of the second to the foremost folder 13 is spaced above the shoulders 63 of the third to the foremost folder and so on, this stepped relationship continuing throughout the plurality of folders of the pack. The several packs P of folders 13 may be identical although, of course, the packs P may embody different numbers of folders 13 and may have identifying or classifying means of different characters.

The holders 14 are permanently secured to the sections 11 to constitute parts or elements of the removable and insertable sections of the tray or box structure. The holders 14 are provided to support or hold the folders 13 in upright or sloping positions and carry or embody the means 15 for lifting the folders 13 to positions where the folders in a pack P are in stepped relation so that the upper edges or the identifying portions 61$^a$ of the folders or the identifying means of the folders' contents are plainly visible and making the folders and their contents readily accessible for removal, sorting, inspection, etc.

In the embodiment of the invention disclosed in the drawings the holders 14 are plate-like members formed of cardboard, fiber board, sheet metal, or the like. The holders 14 project upwardly or substantially vertically from the rear edges of the section bottoms 29. In practice the holders 14 may project a substantial distance beyond the upper edges of the sections 11. The vertical edges of the holders 14 have suitable clearance with the walls 31 of the sections 11 and their lower portions 64 are inclined downwardly and inwardly to have proper clearance with the wall portions 31$^a$. The holders 14 are hinged to the bottoms 29 of the sections 11 so that they may be swung forwardly and rearwardly to facilitate the use of the packs P of folders 13. Suitable hinges 65 hingedly connect the lower edges of the holders 14 with the rear edge portions of the bottoms 29. In practice there may be two spaced hinges 65 connecting each holder 14 with the bottom 29 of its respective section 11. The rear and forward edges of the bottoms 29 may be notched out at 66 to receive the hinges and the projecting portions of the hinges 65 on the adjacent sections 11. Rearwardly projecting flanges 67 may extend along the vertical edges of the holders 14 to lend rigidity to the holders.

A pack P of folders 13 may be arranged in each section 11 to have the lower edges of the folders rest on the bottom 29. The lower corners of the folders 13 are adapted to cooperate with the inclined portions 31$^a$ of the walls 31. The cooperation of the corners of the folders 13 with the inclined wall portions 31$^a$ locates or centers the folders 13 between the walls 31. The folders 13 may project upwardly beyond the upper edges of the box sections 11 as illustrated in the drawings. The packs P of papers or folders 13 are confined between the holders 14 of the adjacent sections 11 and the holders 14 may be hinged or swung to positions to facilitate the examination and use of the folders or their contents. The row of holders 14 and their packs P may normally be inclined upwardly and rearwardly with the rearmost holder 14 resting against the inclined wall 19 of the rear end section 10. When it is desired to make the folders 13 in a section 11 accessible the holder or holders 14 in front of that section 11 may be hinged forwardly so that the foremost pack P rests upon the inclined wall 19 of that front end section 10. This leaves a substantial space in front of the pack P to be examined, this space being wide at its upper end and relatively narrow at its lower end, so that the lower edges of the folders 13 are confined between the adjacent holders 14 whereby the folders 13 cannot slip or fall.

The means 15 are associated with or incorporated in the holders 14 and are operable to elevate the packs P of folders 13 in the sections 11 to assume stepped or graduated positions where the upper edges or the identifying parts of the folders or their contents are all visible and accessible. A lifting means 15 is provided on each holder 14 and the several lifting means may be identical. Each means 15 includes a lifting element 68 shiftable vertically on a holder 14. The lifting elements 68 may be in the form of plates of fiber board, metal, or the like, and may be of the same size and of the same general shape as the holders 14. In the preferred construction the lifting elements 68 are arranged on the forward faces of the holders 14. The lower edges of the lifting elements 68 may normally rest on the bottoms 29 of the sections 11. The side or vertical edges of the elements 68 have suitable clearance with the walls 31 and have inclined lower portions 68ᵃ which clear the inclined wall portions 31ᵃ.

Means is provided for guiding the lifting elements 68 for vertical or longitudinal movement on the holders 14. The means for guiding the elements 68 include spaced vertical or longitudinal slots 69 in the holders 14. In practice there may be two slots 69 in each holder 14 adjacent its opposite longitudinal edges. The portions 70 of the holders 14 surrounding or adjacent the slots 69 are indented or depressed. Pins 71 are fixed to the lifting elements 68 and slidably or shiftably cooperate with the slots 69. The pins 71 may be riveted to the elements 68 and their forward ends are preferably flattened or spun to be flush with the forward surfaces of the lifting elements so that they do not interfere with the papers or folders 13. Comparatively large heads 72 are provided on the pins 71 to cooperate with the surfaces of the depressed portions 70 of the holders 14. The heads 72 cooperating with the depressed surfaces of the holders 14 serve to hold the elements 68 against detachment or separation from the holders. The outer surfaces of the pin heads 72 are flush with or inset from the major rear surfaces of the holders 14 so that they do not interfere with the papers or folders 13 in the adjacent sections 11.

It is preferred to provide a vertical or longitudinal slot 73 in each lifting element 68. The slots 73 are parallel with the slots 69 and are substantially equally spaced between the longitudinal edges of the elements 68. The portions 74 of the elements 15 surrounding or adjacent the slots 73 are preferably depressed or indented. Pins 75 are fixed to the holders 14 and shiftably cooperate with or project into the slots 73. There is one pin 75 on each holder 14. The rear ends of the pins 75 may be riveted over or spun in such a manner that they are flush with the rear surfaces of the holders. Heads 76 are provided on the forward ends of the pins 75 to cooperate with the surfaces of the depressed portions 74 of the elements 68 to assist in preventing separation of the elements 68 from the holders 14. The forward ends or surfaces of the heads 76 are flush with or below the major forward surfaces of the lifting elements 68. The pins 71 are provided on the lower portions of the lifting elements 68 whereas the pins 75 are provided on the upper portions of the holders 14. It will be apparent how the spaced pins 71 and 75 cooperating with their respective slots 69 and 73 guide the lifting elements 68 for vertical or longitudinal movement on the holders 14 and limit or prevent lateral rocking, pivoting, etc. of the elements with respect to the holders. The inner surfaces of the depressed portions 70 and 74 constitute spaced longitudinal tracks or ridges cooperating with the inner surfaces of the elements 68 and the holders 14, respectively, to assure the vertical movement of the elements on the holders 14 with a minimum of friction and effort.

The invention provides novel means for releasably latching the lifting elements 68 in their raised positions. A lateral notch 77 communicates with the lower end of each slot 73. The notches 77 may have substantially horizontal upper and lower walls. The notches 77 are adapted to receive the pins 75 when the elements 68 are raised to retain or assist in retaining the elements in their raised positions. In accordance with the invention the lifting elements 68 are automatically shifted in a lateral direction when they reach their raised positions to effect the engagement of the notches 77 with the pins 75. Lateral notches 78 communicate with the upper ends of the slots 69 to receive the pins 71. The lower walls of the notches 78 may be slightly concave so that the pins may seat in the notches to releasably hold the elements 68 in their raised positions. The upper walls of the notches 78 are joined or connected with the walls of the slots 69 by curved or inclined walls that constitute cam faces 79. When an element 68 is raised or moved upwardly and approaches the limit of its movement the pins 71 cooperate with the cam faces 79. This cooperation effects the lateral shifting of the element 68 with respect to its holder 14 to move the pin 75 into the notch 77 and to bring the pins 71 into the notches 78. When the user releases his hold upon the element 68 the pins 71 cooperate with the lower walls of the notches 78 and the pin 75 cooperates with the lower wall of the notch 77 to latch or retain the element 68 in its raised position.

The card or folder lifting means 15 further include lifting parts on the elements 68 cooperable with the shoulders 63 of the folders 13 to move the folders to stepped elevated positions when the elements are raised. In practice clips or brackets 80 may be riveted or otherwise fixed to the lifting elements 68 adjacent their side or vertical edges and adjacent their lower ends. The brackets 80 have forwardly projecting fingers or hooks 81. The hooks 81 may be substantially horizontal or normal to the forward faces of the elements 68 and are provided at their outer ends with upturned end parts 82. The distance from the end parts 82 to the forward faces of the elements 68 is substantially equal to the distance between the forward face of an element 68 and the rear surface of the holder 14 of an adjacent section 11. The hooks 81 are positioned to be spaced some distance below the lowermost shoulders 63 to allow the folders 13 to be swung forwardly or rearwardly between positions where they rest on the elements 68 and positions where they rest on the holders 14 of the adjacent sections 11 without the interference of their shoulders 63 with the hooks 81 or the parts 82. The hooks 81 may be reinforced by webs 83 on the brackets 80.

When it is desired to raise a pack P of folders 13 for inspection or use the pack is first laid rearwardly against the upwardly and rearwardly inclined lifting element 68 so that the shoulders 63 of the folders are located above the hooks 81. The element 68 is then raised to the position where the pins 71 are received in the notches 78 and the pin 75 is received in the notch 77, as described above. During this upward movement of the element 68 the hooks 81 successively come into lifting engagement with the stepped shoulders 63 of the folders. Because of the graduated or stepped relation of the shoulders 63 the hooks 81 operate to move the folders to be in a graduated or stepped series with their tab portions or identifying portions 61ᵃ stepped one above the other, the portion 61ᵃ of the rearmost folder 13 being at the upper end of the series. The shoulders 63 cooperating with the hooks 81 serve to support the folders 13 in their raised positions.

It is preferred to provide identifying or classifying tabs 85 on the lifting elements 68 to facilitate the location of the several groups P of folders 13. The tabs 85 may be formed of metal or the like and may be riveted or otherwise fixed to the upper edge portions of the elements 68. Window openings 86 may be provided in the tabs 85 and the tabs may contain cards bearing alphabetical characters, numerals, names or the like, to identify the groups or packs P of folders in the respective sections 11. The tabs 85 are preferably such that they may form manually engageable lifting parts on the elements 68. The tabs 85 projecting from the upper edges of the elements 68 may be conveniently grasped for the purpose of raising the elements.

Figure 1:
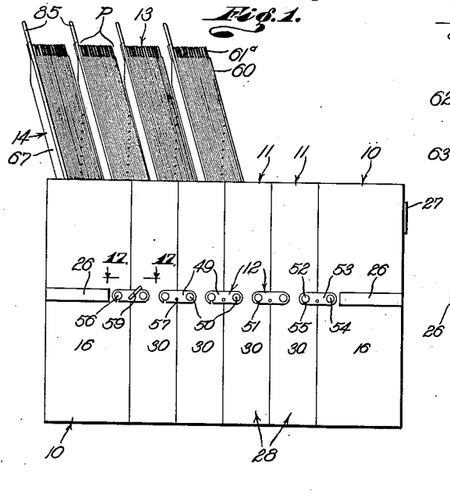
Fig. 1 is a side elevation of the device provided by this invention showing the packs of papers or folders in their normal down positions.
Figure 2:
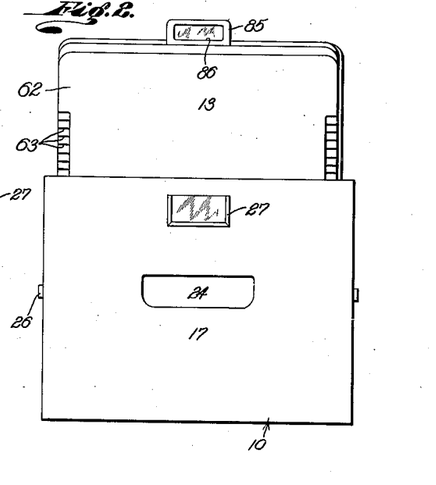
Fig. 2 is a front elevation of the device illustrated in Fig. 1.
Figure 3:
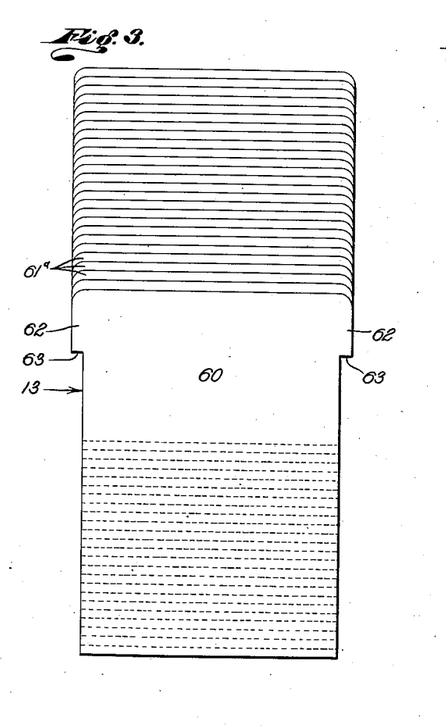
Fig. 3 is a front elevation of a group or pack of papers or folders in a stepped or graduated relation.

It is believed that the utility and practicability of the filing device provided by the present invention will be readily understood from the foregoing detailed description. The sections 10 and 11 may be assembled and connected together as described above, to constitute a drawer or box for carrying the papers or folders 13. It will be readily understood how the tongues of the sections may be inserted in the openings of the adjacent sections and how the latches 49 and 53 may be employed to latch the several sections together to constitute a rigid box structure. In this connection it is to be noted that the device may be assembled to have any desired or necessary number of intermediate sections 11 and that additional sections 11 may be easily and quickly added to the device from time to time. As the sections 11 embody the holders 14 and their card or file lifting means 15 the addition of the sections 11 to the structure provides the device with additional folder or file handling means. With the lifting elements 68 in their down or normal positions the packs P of folders 13 are contained in the device in compact groups. The tabs 85 on the elements 68 constitute accessible and convenient means for hinging or swinging the elements and the holders 14 between positions such as illustrated in Fig. 1 of the drawings and positions where they are inclined forwardly and upwardly. The tabs 85 may carry suitable identifying indicia for identifying the packs P of folders 13 in the several sections 11.

When it is desired to raise the files or folders 13 of a pack P to elevated positions where they are all plainly visible and easily accessible it is only necessary to engage the tab 85 of the proper lifting element 68 and then lift the element. At the end of this upward movement the pins 71 and 75 are automatically moved into their notches 77 and 78 to latch the element 68 in its up position. As described above, upward movement of an element 68 effects the elevation of the several folders 13 of the pack P by reason of the engagement of the hooks 81 with the shoulders 63. The lifting of an element 68 to its raised position brings the folders 13 of the pack P to positions where their identifying portions 61ª are stepped one above the other and are all plainly visible and easily accessible.

Figures 14, 15, 16, 18, 19:
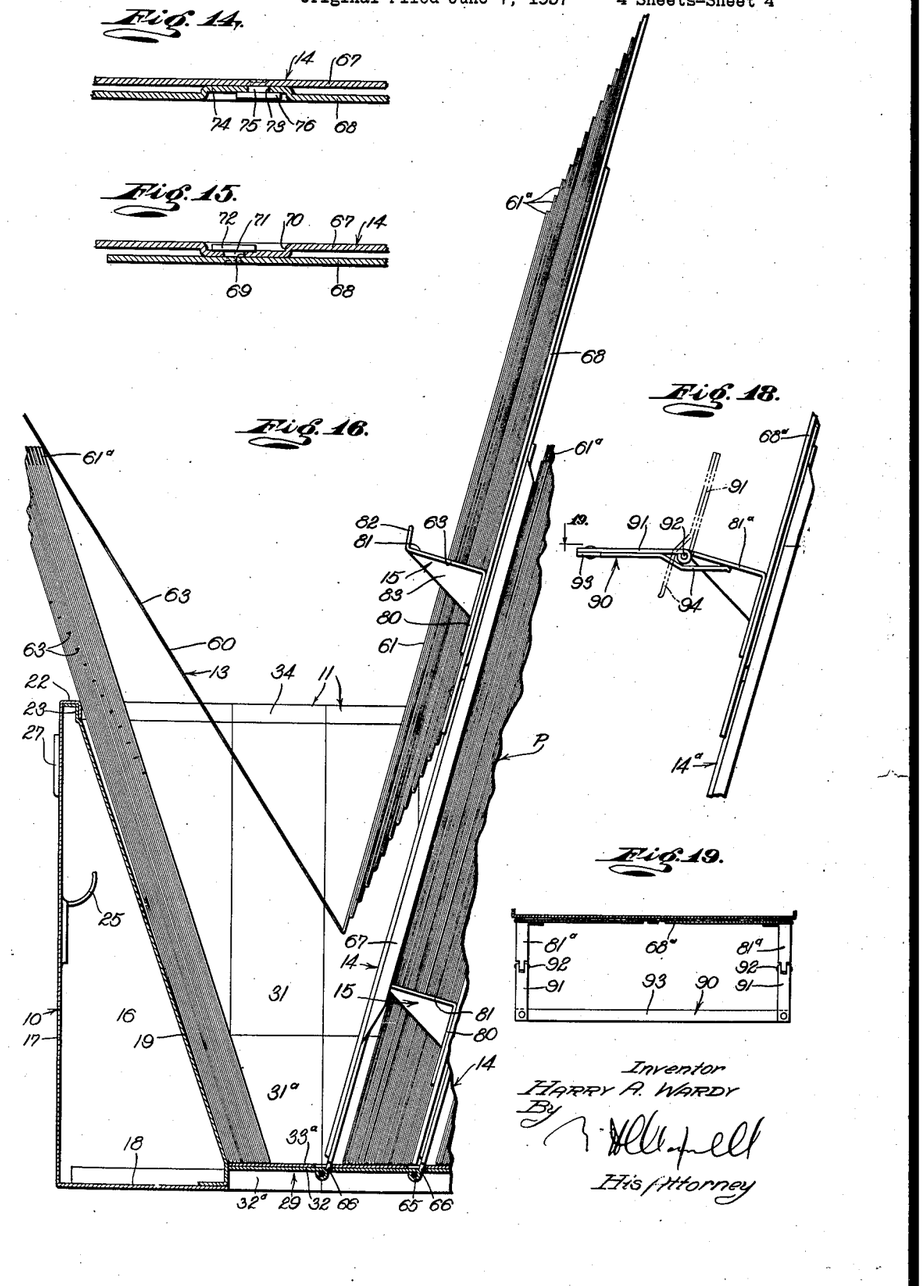
Figs. 14 and 15 are enlarged fragmentary horizontal detailed sectional views taken as indicated by lines 14—14 and 15—15, respectively, on Fig. 11.
Fig. 16 is a fragmentary vertical detailed sectional view of the device illustrating a portion of the folders of the foremost group or pack in their elevated positions, with one of the elevated folders open and showing the remaining folders of the foremost pack in their down positions.
Fig. 18 is a fragmentary edge or side elevation of one of the folder or card holding assemblies embodying an alternative structure and Fig. 19 is a reduced horizontal detailed sectional view taken as indicated by line 19—19 on Fig. 18.

It is to be particularly noted that the folders 13 or their contents, or both, may be easily removed from the device at any time and quickly restored to their proper positions. In actual use the folders 13 may be successively removed from the hooks 81 beginning at the foremost folder and after their contents have been examined or after the postings have been made the folders may be dropped into the sections 11 to lie against the holder 14 of the adjacent section and assume forwardly and upwardly inclined positions. When the folders 13 are dropped in this manner they strike the bottom 29 of the section 11 and tip or fall forwardly against the inclined holder 14 of the adjacent section 11. The section bottom 29, the holder 14 of the section 11 containing the folders 13 and the holder 14 of the adjacent section 11 lock or confine the lower edges of the folders 13 so that they cannot slip or fall from their tilted positions against the adjacent holder. The inclined wall portions 31ª are engaged by the lower corners of the folders as the folders are dropped and operate to locate or center the folders laterally of the section 11. The dropped folders 13 confined at their lower edges and supported as just described, are in position for re-engagement by the hooks 81 after lowering of the element 68 and after rearward tilting of the folders. In this connection it is to be observed that the hooks 81 are positioned so that they do not interfere with the lowered or dropped folders 13 when the folders are tilted rearwardly to lie against the element 68. It is important to note that it is unnecessary to manually straighten or arrange the folders 13 for re-engagement by the hooks 31. If it is desired to retain one of the folders 13 in an open condition when supported on the hooks 81 the front 60 of the folder is raised slightly to disengage its shoulders 63 from the hooks 81 and is then allowed to drop or fall to the open position where it rests against the adjacent holder 14 or the folders 13 resting on said holder. Fig. 16 of the drawings illustrates one of the folders 13 in this open elevated position. It will be observed that a folder held open in this manner has its interior freely accessible for the removal and restoration of the papers or contents. When it is desired to remove the opened folder 13 from the hooks 81 it is only necessary to raise the back 61 of the folder to disengage its shoulders 63 from the hooks 81 and then allow the folder to drop to be centered and located in the section 11 as described above.

To return a lifting element 68 to its down or normal position a slight lateral movement is imparted to the element and the element is moved downwardly. This downward movement of the element 68 may be accomplished without interference of the hooks 81 with the folders 13 that may be resting on the bottom 29 of the section 11. To condition the folders 13 for further elevation it is only necessary to swing them rearwardly against the element 68 whereupon their shoulders 63 are automatically brought to positions for engagement by the hooks 81.

Figs. 18 and 19 illustrate a slightly modified form of the invention intended to facilitate random sorting of the folders 13 when the same are in their elevated positions. In this form of the invention the lifting hooks 81ª are devoid of the fingers 82 and a frame 90 is hinged to the outer ends of the two hooks 81ª of each lifting element 68ª. I will proceed with a description of one frame 90 and its operation, it being understood that this description is applicable to the other holders and lifting means provided with such frames.

The frame 90 is a substantially U-shaped member having two spaced side parts 91 connected with the outer ends of the hooks 81ª by hinges 92 and a transverse part 93 extending between and connecting the outer ends of the side parts 91. A stop 94 is provided on one of the side parts 91 and is adapted to engage the under side of the adjacent hook 81ª to limit downward pivoting of the frame 90. The stop 94 is operable to limit downward movement of the frame 90 and hold the frame in a position where its side parts 91 are horizontal or inclined downwardly and forwardly assuming the holder 14ª to be in an upwardly and rearwardly inclined position. The frame 90 may be swung to the up position illustrated by the broken lines in Fig. 18.

In using the device provided with the frame 90 the pack of folders 13 may be lifted to their elevated positions by the lifting element 68ª, as described above, whereupon the frame 90 may be swung downwardly from its up position to the down position illustrated in the full lines in Fig. 18. In sorting and handling the folders 13 the folders may be shifted from the hooks 81ª to the frame 90, that is, the folders may be moved forwardly to have their shoulders 63 rest on the parts 91 to be supported on the frame. By shifting some of the folders 13 outwardly onto the frame 90 the several folders of the group or pack may be conveniently sorted, opened, removed, etc. If it is desired to hold one of the folders 13 open when in the elevated position the front 60 of the folder is moved forwardly so that its shoulders 63 rest on the frame parts 91 leaving the shoulder 63 of its back 61 on the hooks 81ª. This engagement of the shoulders 63 with the parts 91 and the hooks 81ª holds the folder in an open position where its contents may be examined, removed and restored to their positions in the folder. When it is desired to return the folders 13 to their normal positions the frame 90 may be folded or swung upwardly and backward and any folders that may remain on the frame 90 are automatically shifted backwardly against the folders remaining on the hooks 81ª. When the frame 90 is brought to its up or retracted position it may serve to retain the folders in their compact relation on the hooks 81ª. When the frame 90 is in its retracted or up position illustrated by the broken lines in Fig. 18 it does not interfere with the manipulation of the lifting element 68ª or the holder 14ª.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A filing device of the character described including, two end sections, a plurality of intermediate sections adapted to receive packs of sheets and each comprising a bottom and spaced sides, means in the intermediate sections for elevating their respective packs, means for hingedly securing the said elevating means to the bottoms of their respective sections whereby the elevating means may be moved between upwardly and forwardly and upwardly and rearwardly inclined positions, and latch means for releasably rigidly connecting the end sections and the intermediate sections to form an elongate box structure with the end sections at the ends of the structure.

2. A filing device of the character described including, two end sections, a plurality of intermediate sections adapted to receive packs of sheets, means on the intermediate sections for elevating their respective packs, intermeshing parts on the ends of the adjacent sections, and latch means for releasably connecting the end sections and the intermediate sections to form a box structure with the end sections at the ends of the structure.

3. A filing device including two box end sections, a plurality of intermediate sections, a holder on each intermediate section, packs of papers in the intermediate sections held between the holders of their respective sections and the holders of adjacent sections, means associated with the holders for raising the packs, and means latching the several sections together to form a box with the end sections at the ends of the box.

4. A filing device including two box end sections, a plurality of intermediate sections, a holder on each intermediate section, packs of papers in the intermediate sections held between the holders of their respective sections and the holders of adjacent sections, means associated with the holders for raising the packs, and latch means on each section, the latch means of adjacent sections being cooperable whereby the sections may be connected together to form a box.

5. A filing device including two box end sections, a plurality of intermediate sections, a holder on each intermediate section, packs of papers in the intermediate sections held between the holders of their respective sections and the holders of adjacent sections, means associated with the holders for raising the packs, and cooperable latches on the sections for connecting the sections together to form a box with the end sections at its ends, the latches being releasable whereby additional intermediate sections may be connected in the assembly.

6. A filing device including two box end sections, a plurality of intermediate sections, a holder on each intermediate section, packs of sheets in the intermediate sections held between the holders of their respective sections and the holders of adjacent sections, downwardly facing shoulders on the sheets, the shoulders of the sheets in a pack being in stepped relation, means associated with the holders and cooperable with the shoulders of the sheets in their respective packs to elevate the sheets to positions where they are in stepped relation, and latch means on the sections cooperable to connect the several sections together to form a box with the end sections at the ends of the box.

7. A filing device of the character described including, two end sections, a plurality of intermediate sections, means on the intermediate sections for handling packs of papers, interfitting parts on the adjacent ends of the adjacent intermediate sections operable to prevent relative lateral and vertical movement between the sections, interfitting parts on the adjacent ends of the end sections and the endmost intermediate sections operable to prevent relative lateral and vertical movement between the end sections and said endmost intermediate sections, and releasable latch means connecting the several sections against separation to form a box with the end sections at the ends of the box.

8. A device of the character described including a back member, an element shiftable vertically on the back member, a pack of papers, laterally projecting tabs on the papers, the lower edges of the tabs of adjacent papers being in stepped relation, parts on the element cooperable with the lower edges of the tabs during upward movement of the element to raise the papers and support the same, and a frame hingedly carried by the said parts and adapted to be engaged by the tabs of papers that are moved forwardly from the said parts to support the papers thus moved forwardly.

9. A device of the character described including a back member, an element shiftable vertically on the back member, a pack of papers, laterally projecting tabs on the papers, the lower edges of the tabs of adjacent papers being in stepped relation, parts on the element cooperable with the lower edges of the tabs during upward movement of the element to raise the papers and support the same, and a frame carried by the said parts and adapted to be engaged by the tabs of papers that are moved forwardly from the said parts to support the papers thus moved forwardly, said frame including side members hinged to said parts to project forwardly from the outer ends thereof, and a transverse member extending between and connecting the side members.

10. In a device of the character described, a box section including a bottom, and spaced sides, a holder hinged to the bottom and projecting upwardly between the sides, and a paper lifting element shiftable vertically on the hinged holder.

11. In a device of the character described, a box section including a bottom, and spaced sides, the sides having openings in corresponding ends, tongues on the other ends of the sides, and a holder hinged to the bottom and projecting upwardly between the sides.

12. In a device of the character described, a box section including a bottom, and spaced sides, a holder plate hinged to the bottom and projecting upwardly between the sides, the section being adapted to hold a pack of sheets, a lifting element connected to the plate for vertical movement thereon, and parts on the lifting element engageable with the sheets to raise the sheets.

13. In a device of the character described, a box section including a bottom, and spaced sides, a pack of sheets in the box section having downwardly facing shoulders in stepped relation, a holder hinged to the bottom and projecting upwardly between the sides, a lifting element shiftable on the holder, and parts on the element cooperable with the shoulders to raise the sheets.

14. In a device of the character described, a body adapted to receive a pack of sheets, the sheets of the pack having downwardly facing shoulders in a stepped series, two elements, one a plate secured in the body, the other a lifting member shiftable on the plate, parts on the member cooperable with the shoulders to lift the sheets when the member is raised, a slot in one element, and a pin on the other element cooperable with the slot to guide the lifting member.

15. In a device of the character described, a body adapted to receive a pack of sheets, the sheets of the pack having downwardly facing shoulders in a stepped series, two elements, one a plate secured in the body, the other a lifting member shiftable on the plate, parts on the member cooperable with the shoulders to lift the sheets when the member is raised, a slot in one element having a notch at one end, a pin on the other element operable in the slot to guide the lifting member and receivable in the notch to retain the member in its raised position, and means for effecting relative lateral movement between the elements to bring the notch and the pin into cooperation when the lifting member reaches its raised position.

16. A device of the character described including a back member, an element shiftable vertically on the back member, a pack of papers, laterally projecting tabs on the papers, the lower edges of the tabs of adjacent papers being in stepped relation, parts on the element cooperable with the lower edges of the tabs during upward movement of the element to raise the papers and support the same, and a frame carried by the said parts and adapted to be engaged by the tabs of papers that are moved forwardly from the said parts to support the papers thus moved forwardly.

17. A device of the character described including a box structure having a bottom and spaced sides, spaced holders hinged to the bottom to be swingable between upwardly and rearwardly and upwardly and forwardly inclined positions, sheet lifting elements shiftable vertically on the holders, and downwardly and inwardly inclined parts on said sides for locating the sheets for engagement by the lifting elements when the sheets are dropped into the box structure between the holders.

18. A device for handling packs of sheets, the sheets of the packs having lateral tabs in stepped relation, the device including a container having a bottom and spaced sides, a plurality of plates, means hingedly mounting the lower ends of the plates at the bottom of the container so that the plates are spaced apart to provide compartments for the said packs and so that the plates may be swung forwardly and rearwardly, and a lifting means shiftable vertically on each plate and operable when its plate slopes upwardly and rearwardly to cooperate with the sheets of the pack in front of its plate to raise the sheets to elevated positions in stepped relation.

19. A device for handling packs of sheets, the sheets of the packs having lateral tabs in stepped relation, the device including a container having a bottom and spaced sides, a plurality of plates, means hingedly mounting the lower ends of the plates at the bottom of the container so that the plates are spaced apart to provide compartments for the said packs and so that the plates may be swung forwardly and rearwardly, a lifting means shiftable vertically on each plate and operable when its plate slopes upwardly and rearwardly to cooperate with the sheets of the pack in front of its plate to raise the sheets to elevated positions in stepped relation, and downwardly and inwardly inclined parts on said sides engaged by the lower corners of the sheets to center the sheets, the lower edge portion of the packs being confined and positioned by said parts and the lower portions of the adjacent plates.

HARRY A. WARDY.